US009539977B2

(12) United States Patent
Fudamoto et al.

(10) Patent No.: US 9,539,977 B2
(45) Date of Patent: Jan. 10, 2017

(54) AIRBAG APPARATUS

(71) Applicants: Masanori Fudamoto, Tokyo (JP);
Kazutaka Sugimoto, Tokyo (JP);
Kazuhiro Abe, Tokyo (JP)

(72) Inventors: Masanori Fudamoto, Tokyo (JP);
Kazutaka Sugimoto, Tokyo (JP);
Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 31 days.

(21) Appl. No.: 14/442,155

(22) PCT Filed: Sep. 27, 2013

(86) PCT No.: PCT/JP2013/076325
§ 371 (c)(1),
(2) Date: May 12, 2015

(87) PCT Pub. No.: WO2014/077037
PCT Pub. Date: May 22, 2014

(65) Prior Publication Data
US 2016/0257278 A1 Sep. 8, 2016

(30) Foreign Application Priority Data

Nov. 13, 2012 (JP) ................................. 2012-249746

(51) Int. Cl.
*B60R 21/16* (2006.01)
*B60R 21/217* (2011.01)
*B60R 21/264* (2006.01)
(52) U.S. Cl.
CPC ........... *B60R 21/217* (2013.01); *B60R 21/264* (2013.01)

(58) Field of Classification Search
CPC ............... B60R 21/217; B60R 21/2171; B60R 2021/2172; B60R 2021/2175
(Continued)

(56) References Cited

U.S. PATENT DOCUMENTS 4,913,461 A * 4/1990 Cuevas ................. B60R 21/217
280/731
5,118,133 A 6/1992 Zushi et al.
(Continued)

FOREIGN PATENT DOCUMENTS

JP H03-079447 4/1991
JP H09-104314 4/1997
(Continued)

OTHER PUBLICATIONS

International Search Report mailed on Dec. 24, 2013.

*Primary Examiner* — Toan To
(74) *Attorney, Agent, or Firm* — IPUSA, PLLC

(57) ABSTRACT

An airbag apparatus includes a cylindrical-shaped inflator that generates gas, an airbag that is inflated by the gas generated by the inflator, a retainer body to which the inflator is attached and fixed and including an insertion hole into which the inflator can be inserted, a flange member that is caulked or press-fitted to the inflator and that constrains the inflator from moving toward one end side in an axial direction and includes an insertion hole into which the inflator can be inserted and a flange surface extending outward in a radial direction, and a retaining member that constrains the inflator from moving toward another end side in the axial direction. The inflator is attached and fixed to the retainer body by bolting the retainer body and the flange member.

7 Claims, 8 Drawing Sheets

(58) Field of Classification Search
USPC .................................... 280/740, 741, 742
See application file for complete search history.

(56) References Cited

U.S. PATENT DOCUMENTS

| | | | |
|---|---|---|---|
| 5,503,426 A | | 4/1996 | Lang et al. |
| 5,547,213 A * | | 8/1996 | Lang ............... B60R 21/217 |
| | | | 280/728.2 |
| 5,692,771 A * | | 12/1997 | Milne, III ......... B60R 21/217 |
| | | | 280/728.2 |
| 5,720,493 A * | | 2/1998 | Sugiyama .......... B60Q 5/003 |
| | | | 200/61.54 |
| 5,782,481 A * | | 7/1998 | Magoteaux ........ B60R 21/217 |
| | | | 280/728.2 |
| 5,836,608 A * | | 11/1998 | Soderquist ......... B60R 21/217 |
| | | | 280/728.2 |
| 5,860,672 A * | | 1/1999 | Petersen ........... B60R 21/217 |
| | | | 280/728.2 |
| 5,992,874 A * | | 11/1999 | Sugiyama .......... B60Q 5/003 |
| | | | 280/728.2 |
| 6,042,147 A | | 3/2000 | Nishijima et al. |
| 6,709,004 B1 * | | 3/2004 | Judd ................. B60R 21/217 |
| | | | 280/728.2 |
| 2001/0035632 A1 | | 11/2001 | Amamori et al. |
| 2005/0194768 A1 * | | 9/2005 | Bonam ............. B60R 21/217 |
| | | | 280/728.2 |
| 2013/0221638 A1 | | 8/2013 | Hiruta et al. |

FOREIGN PATENT DOCUMENTS

| | | |
|---|---|---|
| JP | 2001-301560 | 10/2001 |
| JP | 3878220 | 11/2006 |
| JP | 2010-143314 | 7/2010 |
| JP | 2012-096711 | 5/2012 |
| WO | 98/14353 | 4/1998 |

* cited by examiner

AIRBAG APPARATUS

TECHNICAL FIELD

The present invention relates to an airbag apparatus, and more particularly to an airbag apparatus including an inflator that has an attachment/fixing flange member caulked or press-fitted thereto.

BACKGROUND ART

Conventionally, there is known an airbag apparatus including an inflator that has an attachment/fixing flange member caulked or press-fitted thereto (see, for example, Patent Document 1). The airbag apparatus includes a cylindrical inflator that generates gas, an airbag that is inflated by the gas generated by the inflator, a flange member that has a flange surface radially extending outward from a side surface of the inflator, and a retainer having an insertion hole that allows the inflator to be inserted therein and serving as a base member to which the inflator is attached and fixed. The inflator is attached and fixed to the retainer by inserting bolts into a through-hole provided at a peripheral part of an opening of the airbag, a through-hole provided in the flange surface of the flange member, and a through-hole provided in the retainer and fastening nuts to the bolts.

RELATED ART DOCUMENT

Patent Document

Patent Document 1: Japanese Laid-Open Patent Publication No. 9-104314

DISCLOSURE OF THE INVENTION

Problems to be Solved by the Invention

However, with the airbag apparatus described in Patent Document 1, the shape of the inflator is limited due to the requirement of providing irregularities on the side surface of the inflator for attaching the flange member to the side surface of the inflator. Further, with the airbag apparatus, the flange member supports a surface of the inflator facing one end side in an axial direction at a seat part along with supporting another surface of the inflator on the other end side in the axial direction by having its edges bent on the surface of the inflator facing the other end side in the axial direction. Therefore, an apparatus for bending the edges of the flange member becomes complicated or attaching the flange member to the side surface of the inflator becomes burdensome. Thus, assembly efficiency is degraded. Further, with the airbag apparatus, although the flange member constrains the inflator from moving towards both ends in the axial direction, the seat part of the flange member for supporting the surface of the inflator facing the one end side in the axial direction is not significantly large. Therefore, it may be insufficient for the flange member to constrain the inflator from moving toward the one end side in the axial direction.

In view of the above, an embodiment of the present invention has an objective of providing an airbag apparatus that can easily attach the flange member to the inflator without limiting the degree of freedom of the shape of the inflator and reliably constrain the relative movement between the inflator and the flange member in the axial direction.

Means of Solving the Problems

In order to solve the above-described object, the present invention provides an airbag apparatus including a cylindrical-shaped inflator that generates gas, an airbag that is inflated by the gas generated by the inflator, a retainer body to which the inflator is attached and fixed and including an insertion hole into which the inflator can be inserted, a flange member that is caulked or press-fitted to the inflator and that constrains the inflator from moving toward one end side in an axial direction and includes an insertion hole into which the inflator can be inserted and a flange surface extending outward in a radial direction, and a retaining member that constrains the inflator from moving toward another end side in the axial direction. The inflator is attached and fixed to the retainer body by bolting the retainer body and the flange member.

EMBODIMENTS FOR CARRYING OUT THE INVENTION

Next, an airbag apparatus according to an embodiment of the present invention is described in detail with reference to the accompanying drawings.

Figure 1:
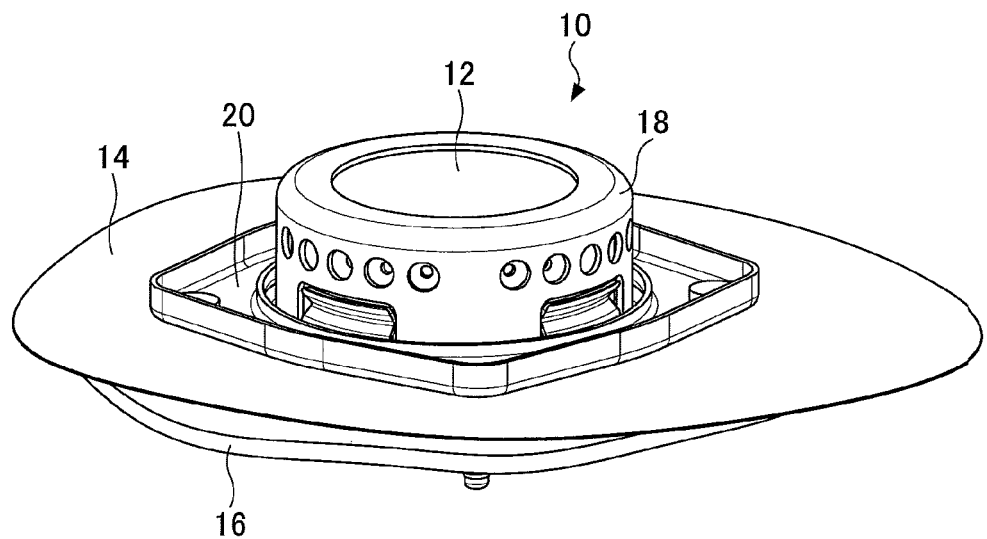
FIG. 1 is a perspective view of an airbag apparatus according to an embodiment of the present invention.
Figure 2:
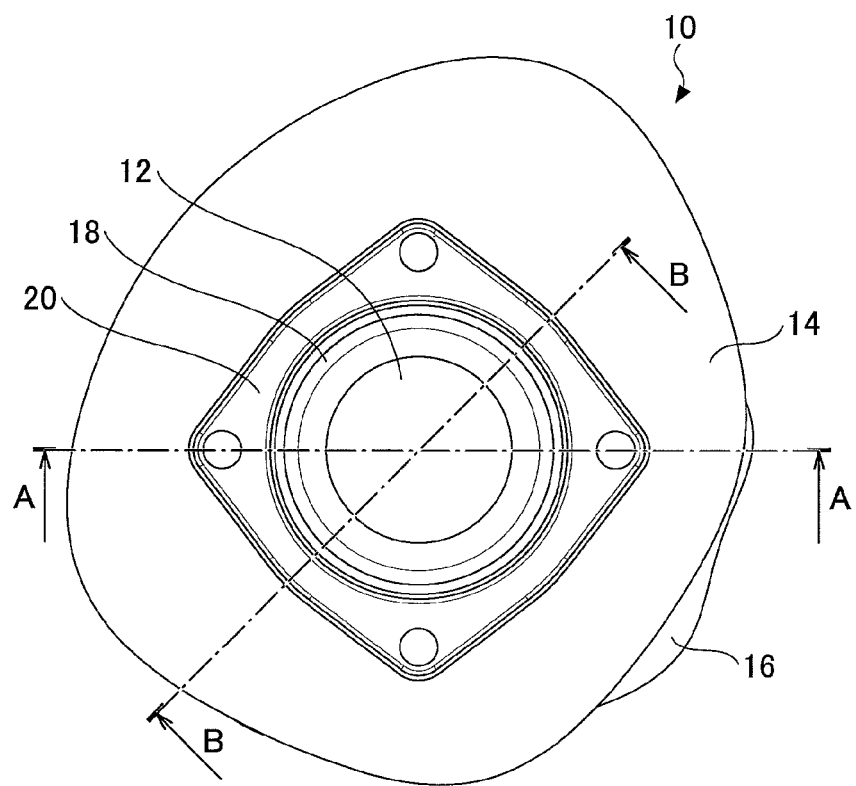
FIG. 2 is an upper view of an airbag apparatus according to an embodiment of the present invention.
Figure 3:
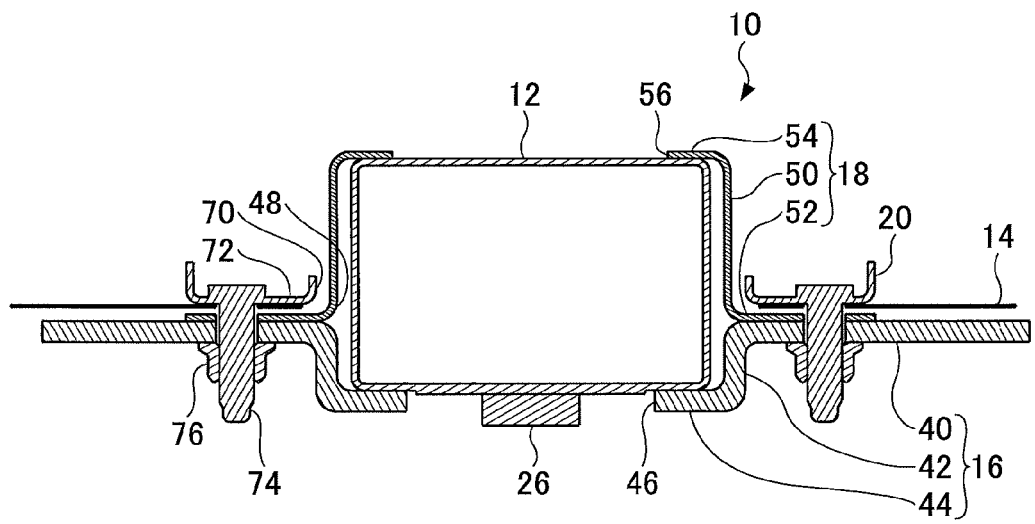
FIG. 3 is a cross-sectional view of the airbag apparatus taken along line A-A of FIG. 2.
Figure 4:
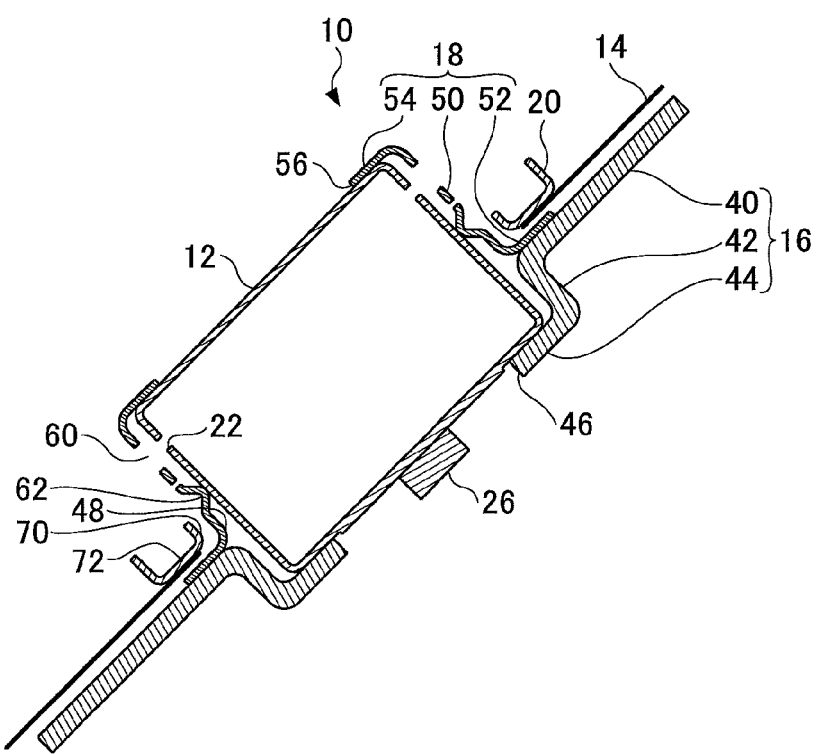
FIG. 4 is a cross-sectional view of the airbag apparatus taken along line B-B of FIG. 2.
Figure 5:
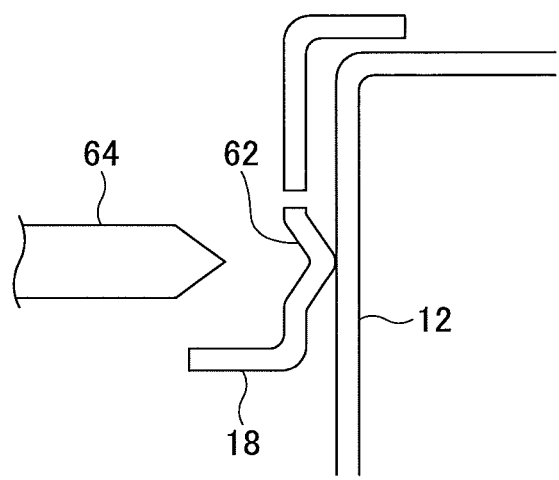
FIG. 5 is a schematic diagram for describing a method of caulking a flange member to an inflator of an airbag apparatus according to an embodiment of the present invention.
Figure 6:
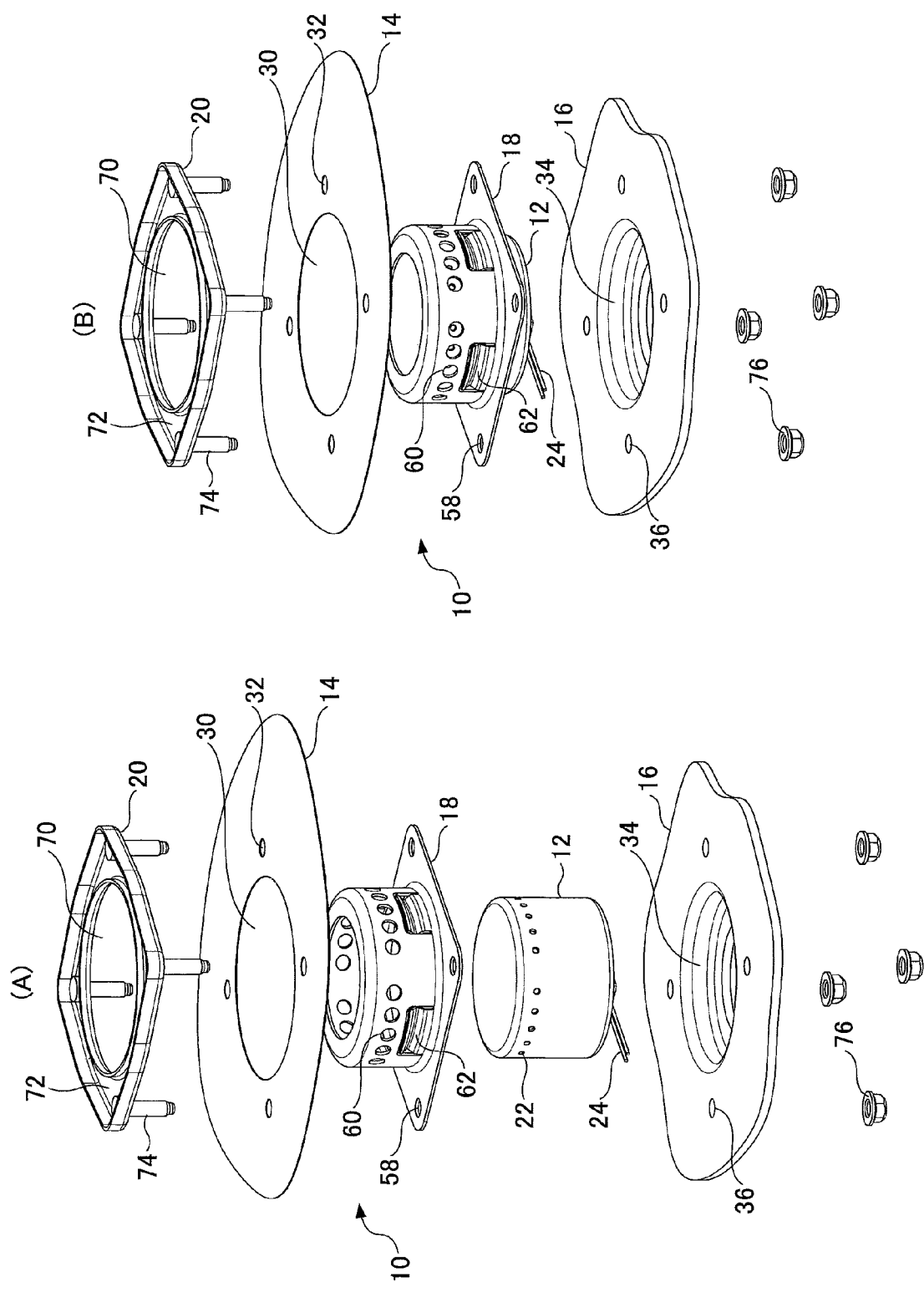
FIG. 6 is an exploded view of an airbag apparatus according to an embodiment of the present invention.

FIG. 1 is a perspective view of an airbag apparatus 10 according to an embodiment of the present invention. FIG. 2 is an upper view of the airbag apparatus 10 according to an embodiment of the present invention. FIG. 3 is a cross-sectional view of the airbag apparatus 10 taken along line A-A of FIG. 2. FIG. 4 is a cross-sectional view of the airbag apparatus 10 taken along line B-B of FIG. 2. FIG. 5 is a schematic diagram for describing a method of caulking a flange member to an inflator of the airbag apparatus 10 according to an embodiment of the present invention. FIG. 6 is an exploded view of the airbag apparatus 10 according to an embodiment of the present invention. It is to be noted that FIG. 6(A) illustrates a state before a flange member is caulked to an inflator and FIG. 6(B) illustrates a state after the flange member is caulked to the inflator.

In this embodiment, the airbag apparatus 10 includes an inflator 12, an airbag 14, a retainer 16, an inflator flange 18, and a bag ring 20. The airbag apparatus 10 is an apparatus that inflates and spreads the airbag 14 by using gas generated by the inflator 12. The airbag apparatus 10 serves to protect, for example, a passenger of a vehicle by the inflating and spreading of the airbag 14. It is to be noted that the side of the airbag apparatus 10 in which the airbag 14 inflates and spreads is referred to as "spreading side" and the side that is opposite of the spreading side is referred to as "non-spreading side".

The inflator 12 is a member that generates high pressure gas. The inflator 12 has a cylindrical shape. Multiple gas ejection holes 22 are provided on a side surface of the inflator 12. The gas ejection holes 22 are formed on the side surface of the inflator 12 at predetermined angles on the spreading side. The inflator 12 releases generated gas from the gas ejection holes 22. A connector 26 for connecting to an external device (not illustrated) via a wiring 24 is attached to an end surface of the inflator 12 on the non-spreading side in the axial direction. The inflator 12 generates gas for inflating and spreading the airbag 14 in accordance with an ejection instruction signal transmitted from the external device via the wiring 24 and the connector 26.

The airbag 14 is a bag-like member having an opening 30 provided at a portion thereof. The airbag 14 inflates and spreads by supplying gas generated by the inflator 12 from the opening 30 and fills the airbag 14 with the gas. Through-holes 32 are provided at a periphery of the opening 30 of the airbag 14. The airbag 14 includes multiple through-holes 32 (for example, four) are arranged about the opening 30 at intervals of a predetermined angle (for example, 90°) at the periphery of the opening 30. Each through-hole 32 has a substantially circular shape.

The retainer 16 is a member to which the inflator 12 is attached and fixed. The retainer 16 is a metal or resin plate member having a predetermined thickness in the axial direction. An insertion hole 34 having a circular shape is provided substantially at the center of the retainer 16 to allow the inflator 12 to be inserted therein. The insertion hole 34 is formed to have a diameter that is slightly greater than the outer diameter of the inflator 12. Through-holes 36 penetrating the retainer 16 in the axial direction are provided at the periphery of the insertion hole 34. The retainer 16 has multiple through-holes 36 (for example, four) are arranged about the insertion hole 34 at intervals of a predetermined angle (for example, 90°) at the periphery of the insertion hole 34. Each through-hole 36 has a substantially circular shape. The through-hole 36 is formed to have a size that is substantially the same as the size of the through-hole 32 of the airbag 14.

The retainer 16 is formed to have a circular hat-like shape allowing the inflator 12 to be accommodated on the non-spreading side in the axial direction, so that the retainer 16 can support the inflator 12 on the non-spreading side to constrain the inflator 12 from moving toward the non-spreading side. More specifically, the retainer 16 includes a circular ring-shaped flange part 40 extending outward in the radial direction at the periphery of the insertion hole 34, a cylindrical-shaped cylinder part 42 extending in the axial direction from an inner end of the flange part 40 (more specifically, on the non-spreading side in the axial direction), and a bottom part 44 formed to close the opening of the cylindrical part 42 in the axial direction on the non-spreading side).

An opening hole 46 is provided in the axial direction at substantially the center of the bottom part 44. The opening hole 46 is a wiring extracting port for extracting the connector 26 attached to the end surface of the inflator 12 on the non-spreading side in the axial direction and the wiring 24 connected to the connector 26. The opening hole 46 is formed to have a diameter smaller than the outer diameter of the inflator 12. Therefore, when the inflator 12 is accommodated in the retainer 16, the bottom part 44 supports the inflator 12 on the non-spreading side in the axial direction, so that the inflator 12 is constrained from moving toward the non-spreading side.

The inflator flange 18 includes a flange surface that extends outward in a radial direction from the side of the side surface of the inflator 12. The inflator flange 18 is an attachment piece for attaching the inflator 12 to the retainer 16. That is, when the inflator 12 is assembled to the inflator flange 18, the inflator 12 becomes a flange-attached inflator having a flange surface extending outward in the radial direction from its side surface. Thereby, the inflator 12 is attached to the retainer 16 by way of the inflator flange 18.

The inflator flange 18 includes a circular-shaped insertion hole 48 provided substantially at a center of the flange surface having a substantially quadrangular shape for allowing the inflator 12 to be inserted therein. The insertion hole 48 is formed to have a diameter larger than an outer diameter of the inflator 12. The inflator flange 18 is formed to have a hat-like shape to accommodate the spreading side of the inflator 12 in the axial direction. More specifically, the inflator flange 18 includes a cylindrically-shaped cylinder part 50 extending in the axial direction to cover the side surface of the inflator, a flange part 52 extending outward in the radial direction on the non-spreading side of the cylinder part 50 in the axial direction, and a bottom part 54 formed to close an opening of the cylinder part 50 on the spreading side in the axial direction.

An opening hole 56 that is open in the axial direction is provided substantially at the center of the bottom part 54. The opening hole 56 is formed to have a diameter smaller than the outer diameter of the inflator 12. Therefore, when the inflator 12 is accommodated in the inflator flange 18, the bottom part 54 supports the non-spreading side of the inflator 12 in the axial direction, so that the inflator 12 is constrained from moving toward the non-spreading side.

Through-holes 58 penetrating the inflator flange 18 in the axial direction are provided at the periphery of the insertion hole 48 (i.e., flange surface of the flange part 52). The inflator flange 18 has multiple through-holes 58 (for example, four) which are arranged about the insertion hole 48 at intervals of a predetermined angle (for example, 90°) at the periphery of the insertion hole 48. Each through-hole 58 has a substantially circular shape. The through-hole 58 is formed to have a size that is substantially the same as the size of the through-hole 32 of the airbag 14 or the through-hole 36 of the retainer 16.

Multiple gas discharge holes 60 are provided in the side surface of the inflator flange 18 (more specifically, the side surface of the cylinder part 50). The gas discharge holes 60 are arranged at intervals of a predetermined angle on the side surface of the inflator flange 18. The gas generated in the inflator 12 and released from the gas ejection hole 22 flows into the airbag 14 by way of the gas discharge holes 60 of the inflator flange 18.

Further, caulking pieces 62 for caulking the inflator flange 18 to the side surface of the inflator 12 are provided on the side surface of the inflator flange 18 (more specifically, the side surface of the cylinder part 50). The inflator flange 18 has multiple caulking pieces 62 (for example, four) which are arranged at intervals of a predetermined angle (for example, 90°) on the side surface of the inflator flange 18. Each caulking piece 62 is a plate-like member obtained by cutting the side surface of the inflator flange 18 into a C-shape. As illustrated in FIG. 5, each caulking piece 62 is caulked to the inflator 12 by exerting pressure in a center axis direction (inward in a radial direction) throughout the entire periphery by using a caulking device 64, so that the inflator flange 18 is caulked and fixed to the side surface of the inflator 12.

Further, the bag ring 20 is a metal or a resin member for attaching a peripheral part of the opening 30 of the airbag 14 to an end surface of the retainer 16 on the spreading side in the axial direction. The bag ring 20 having a substantially quadrangular plate-like shape includes a circular-shaped insertion hole 70 for allowing the inflator 12 to be inserted therein and a flange part 72 extending outward in a radial direction from the periphery of the insertion hole 70. The insertion hole 70 is formed to have a diameter that is larger than the outer diameter of the inflator 12 and larger than the inner diameter of the opening 30 of the airbag 14.

Bolts 74 extending in the axial direction are integrally formed with the flange part 72 of the bag ring 20. Multiple bolts 74 (for example, four) are arranged at the corner parts on the end surface of the flange part 72 of the bag ring 20 on the non-spreading side in the axial direction. It is to be noted that the bolts 74 may be provided to be separate from the bag ring 20. In this case, through-holes for inserting the bolts 74 are formed in the flange part 72 of the bag ring 20. The bolt 74 is formed to have an outer diameter that is slightly smaller than the diameter of the through-hole 32 of the airbag 14, the diameter of the through-hole 58 of the flange part 52 of the inflator flange 18, and the diameter of the through-hole 36 of the retainer 16. The bolt 74 of the bag ring 20 is inserted into the through-hole 32 of the airbag 14, the through-hole 58 of the flange part 52 of the inflator flange 18, and the through-hole 36 of the retainer 16 and is fastened to the nut 76. Thereby, the bag ring 20, the airbag 14, the inflator flange 18, and the retainer 16 are assembled together and attached/fixed to each other.

The airbag apparatus 10 according to an embodiment of the present invention has a configuration in which the inflator flange 18 including the above-described structure is caulked and fixed to the side surface of the inflator 12, and the inflator flange 18 that is caulked to the inflator 12 is fastened to the airbag 14, the retainer 16, and the bag ring 20 by way of the bolts 74 and the nuts 76.

More specifically, in manufacturing the airbag apparatus 10, the retainer 16, the inflator 12, the inflator flange 18, the airbag 14, and the bag ring 20 are prepared (FIG. 6(A)). Then, after inserting the inflator 12 on the spreading side in the axial direction into the insertion hole 48 of the inflator flange 18, each caulking piece 62 of the inflator flange 18 is caulked to the side surface of the inflator 12 by using the caulking apparatus 64. Thereby, the inflator flange 18 is caulked and fixed to the side surface of the inflator 12 (FIG. 6(B)).

By performing the caulking and fixing, the relative axial rotation between the inflator 12 and the inflator flange 18 is constrained. As described above, the inflator 12 is formed in a cylindrical shape, and the flange surface of the inflator flange 18 is formed in a substantially quadrangular plate-like shape. Therefore, by caulking and fixing the inflator 12 and the inflator flange 18 to each other at an appropriate position in the axial direction, the angular orientation of the inflator 12 can be identified to some degree by the appearance of the inflator 12 having the inflator flange 18 attached thereto. In addition, the handling and carrying of the inflator 12 having the inflator flange 18 attached thereto can be simplified.

After the inflator flange 18 is caulked and fixed to the side surface of the inflator 12 as described above, the non-spreading side of the inflator 12 in the axial direction having the inflator flange 18 caulked and fixed thereto is inserted into the insertion hole 34 of the retainer 16. Further, the spreading side of the inflator 12 in the axial direction is inserted into the opening 30 of the airbag 14 and the insertion hole 70 of the bag ring 20 in this order. Further, the bolts 74 of the bag ring 20 are inserted into the through-holes 32 of the airbag 14, the through-holes 58 of the flange part 52 of the inflator flange 18, and the through-holes 36 of the retainer 16. Then, the bolts 74 of the bag ring 20 inserted into each of the through-holes 32, 58, 36 are fastened by the nuts 76.

By the fastening with the bolts, the inflator flange 18 being caulked and fixed to the inflator 12, the airbag 14, the retainer 16, and the bag ring 20 are attached and fixed to each other. That is, the inflator 12 is attached and fixed to the retainer 16 by bolting the retainer 16 and the inflator flange 18 being caulked to the inflator 12. In this case, the peripheral part of the opening 30 of the airbag 14 is sandwiched between the flange part 52 of the inflator flange 18 and the flange part 72 of the bag ring 20.

The inflator 12 is formed to have an outer diameter that is smaller than the diameter of the insertion hole 34 of the retainer 16 and the diameter of the insertion hole 48 of the inflator flange 18 but larger than the diameter of the opening hole 46 of the bottom part 44 of the retainer 16 and the diameter of the opening hole 56 of the bottom part 54 of the inflator flange 18. Therefore, when the inflator flange 18, the airbag 14, the retainer 16, and the bag ring 20 are attached and fixed to each other, the inflator 12 is supported at its end surface on the non-spreading side in the axial direction by the bottom part 44 of the retainer 16 and supported at its end surface on the spreading side in the axial direction by the bottom part 54 of the inflator flange 18. Thus, after the assembly of the airbag apparatus 10, the inflator 12 is reliably constrained from moving toward the non-spreading side in the axial direction by the retainer 16 and reliably constrained from moving toward the spreading side in the axial direction by the inflator flange 18 even after the airbag 14 is spread.

In the structure of the airbag apparatus 10 according to an embodiment of the present invention, the inflator flange 18 is attached to the inflator 12, so that the inflator 12 can be attached and fixed to the retainer 16. This attachment of the inflator flange 18 to the inflator 12 is achieved by caulking the caulking pieces 62 of the inflator flange 18 to the side surface of the inflator 12. Therefore, in attaching the inflator flange 18 to the inflator 12, there is no need to provide any irregularities or steps on the side surface of the inflator 12. Thus, the degree of freedom of the shape of the inflator 12 can be prevented from being limited.

Further, according to the embodiment of the present invention, because the inflator flange 18 is attached to the inflator 12 by caulking, the side surface of the inflator 12 need not be formed with a significantly large thickness compared to a structure in which a flange is attached to the inflator 12 by welding. Therefore, weight reduction and simplification of assembly of the entire airbag apparatus 10 can be achieved. Further, the inflator flange 18 can be sufficiently caulked to the inflator 12 by exerting pressure on the caulking piece 62 of the inflator flange 18 in a center axis direction (inward in a radial direction) throughout the entire periphery by using the caulking device 64. Because complication of devices and burden of attachment can be alleviated when attaching the inflator flange 18 to the inflator 12, the assembly efficiency of the airbag apparatus 10 can be prevented from degrading.

Therefore, with the airbag apparatus 10 according to an embodiment of the present invention, the inflator flange 18 can be easily attached to the inflator 12 without limiting the degree of freedom of the shape of the inflator 12, and the relative movement between the inflator 12 and the inflator flange 18 in the axial direction can be reliably constrained.

In the above-described embodiments, the retainer 16 corresponds to "retainer body" and "retaining member" described in the claims, the flange part 40 of the retainer 16 corresponds to the "retainer body" described in the claims, the bottom part 44 of the retainer 16 corresponds to the "retaining member" described in the claims, the inflator flange 18 corresponds to the "flange member" described in the claims, the spreading side in the axial direction corresponds to the "one end side in the axial direction" described in the claims, the non-spreading side corresponds to the "other end side in the axial direction" described in the claims, and the bottom part 54 of the inflator flange 18 corresponds to the "support part" described in the claims.

Incidentally, in the above-described embodiment, the inflator 12 is formed to have an outer diameter that is smaller than the diameter of the insertion hole 48 of the inflator flange 18. Further, the caulking piece 62 for caulking and fixing to the side surface of the inflator 12 is provided on the side surface of the cylinder part 50 of the inflator flange 18, so that the caulking piece 62 can be caulked to the side surface of the inflator 12 by using the caulking apparatus 64. Thereby, the inflator flange 18 and the inflator 12 are caulked and fixed to each other.

Figure 7:
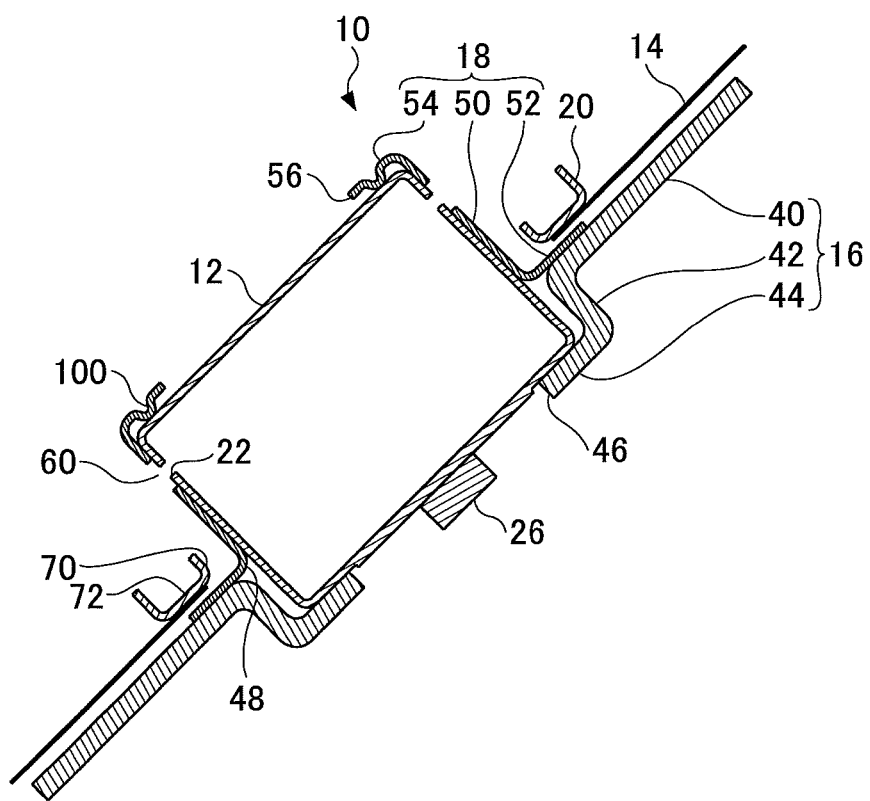
FIG. 7 is a cross-sectional view of an airbag apparatus of a modified example according to an embodiment of the present invention.

The present invention is, however, not limited to such embodiment. While forming the insertion hole 48 of the inflator flange 18 with a diameter greater than the outer diameter of the inflator 12, a recess part being recessed toward the center side in the axial direction may be provided on the side surface of the inflator flange 18 in which an inner diameter of the recess part is formed to be substantially equal to or slightly smaller than the outer diameter of the inflator 12, so that the inflator flange 18 and the inflator 12 may be press-fitted and fixed to each other by press-fitting the inflator flange 18 to the side surface of the inflator 12. Further, as illustrated in FIG. 7, the inflator 12 may be formed to have an outer diameter that is substantially equal to the diameter of the insertion hole 48 of the inflator flange 18, so that the inflator flange 18 and the inflator 12 may be press-fitted and fixed to each other by pressing fitting the inflator flange 18 to the side surface of the inflator 12. With the structure in which the inflator flange 18 is press-fitted to the side surface of the inflator 12, a portion 100 in the vicinity of the opening hole 56 of the bottom part 54 of the inflator flange 18 may be caulked to an end surface of the inflator 12 on the spreading side in the axial direction as illustrated in FIG. 7.

Figure 8:
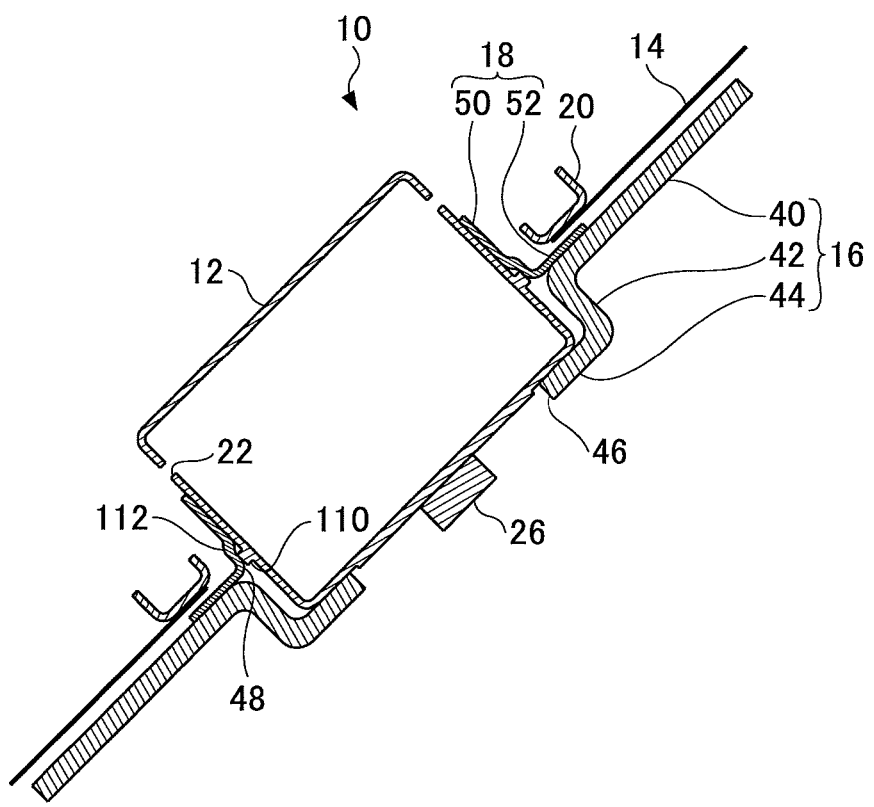
FIG. 8 is a cross-sectional view of an airbag apparatus of a modified example according to an embodiment of the present invention.

Further, in the above-described embodiment, the caulking piece 62 of the side surface of the inflator flange 18 is caulked to the side surface of the inflator 12 without providing any irregular steps on the side surface of the inflator 12, and the end surface of the inflator 12 on the spreading side in the axial direction is supported by the bottom part 54 of the inflator flange 18 by contacting the bottom part 54 of the inflator flange 18. The present invention is, however, not limited to such embodiment. As illustrated in FIG. 8, a projecting part 110 projecting outward in the radial direction may be provided on the side surface of the inflator 12, in which the inflator 12 is formed to have an outer diameter that is substantially equal to the diameter of the insertion hole 48 of the inflator flange 18 at the peak of the projecting part 110. In addition, the inflator flange 18 may be constituted only by the cylindrical part 50 and the flange part 52, and a portion of the cylindrical part 50 corresponding to the projecting part 110 of the inflator 12 on the spreading side in the axial direction may be caulked to the projecting part 110 of the inflator 12 by exerting pressure in a center axis direction throughout the entire periphery. Thereby, a step 112 corresponding to the projecting part 110 of the inflator 12 is formed on the side surface of the inflator flange 18.

With such modified example, the inflator flange 18 is caulked and fixed to the inflator 12 on the spreading side of the projecting part 110 in the axial direction and the inflator flange 18 contacts the inflator 12 on the spreading side of the projecting part 110 in the axial direction, so that the inflator 12 can be supported and constrained from moving toward the spreading side in the axial direction. With the structure of the modified example, the inflator flange 18 and the inflator 12 may be press-fitted and fixed to each other instead of being caulked and fixed to each other.

In the above-described modified examples, the projecting part 110 of the inflator 12 corresponds to the "side surface projecting part" described in the claims, and the step 112 of the inflator flange 18 corresponds to the "step" described in the claims. Further, the length of the cylindrical part 50 of the inflator flange 18 in the axial direction may be comparatively long as illustrated in FIG. 8 or may be comparatively short. Further, the length of the cylindrical part 50 in the axial direction may be extending from the inner end of the flange part 52 to the extent that the gas ejection holes 22 of the inflator 12 do not become covered. In this case, the cylindrical part 50 may be formed without the gas discharge hole 60. Further, the step 110 provided in the side surface of the inflator 12 may have a width in the axial direction that is comparatively short as illustrated in FIG. 8 or comparatively long.

Figure 9:
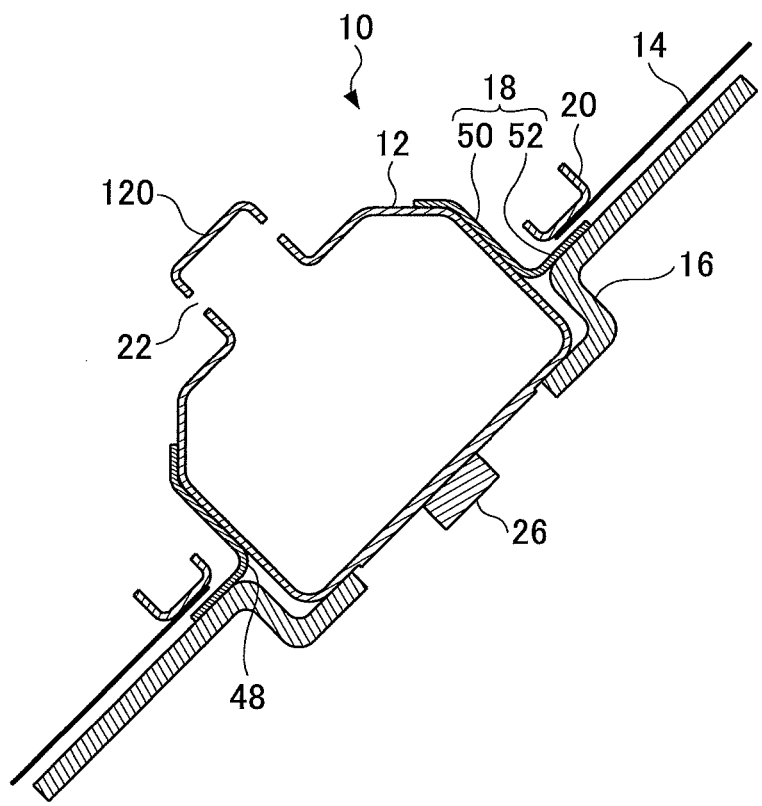
FIG. 9 is a cross-sectional view of an airbag apparatus of a modified example according to an embodiment of the present invention.

Further, in the above-described embodiment, the inflator 12 is formed having a cylindrical shape, and the gas ejection holes 22 are formed in the side surface of the cylindrical shape of the inflator 12. However, as illustrated in FIG. 9, the inflator 12 may be formed in a substantially cylindrical shape and have a projecting part 120 projecting toward the spreading side in the axial direction from an upper surface of the inflator 12 on the spreading side in the axial direction, so that the gas ejection holes 22 are provided on the side or upper surface of the projecting part 120 (side surface in FIG. 9). In this modified example, the diameter of the cylindrical portion of the inflator 12 and the diameter of the insertion hole 48 of the inflator flange 18 are substantially equal. In addition, the inflator flange 18 may be constituted only by the cylindrical part 50 and the flange part 52, and an end portion of the cylindrical part 50 on the spreading side in the axial direction may be caulked to the vicinity of a corner part of the inflator 12 by exerting pressure in a center axis direction throughout the entire periphery. Further, the inflator flange 18 may be press-fitted to the side surface of the inflator 12. The corner part of the inflator 12 at an end portion of the inflator 12 on the spreading side in the axial direction may be formed so that the side surface of the inflator 12 and the bottom surface of the inflator 12 are orthogonal to each other. Alternatively, the corner part of the inflator 12 may be faulted so that the side surface of the inflator 12 and the bottom surface of the inflator 12 are obliquely connected to each other as illustrated in FIG. 9.

Figure 10:
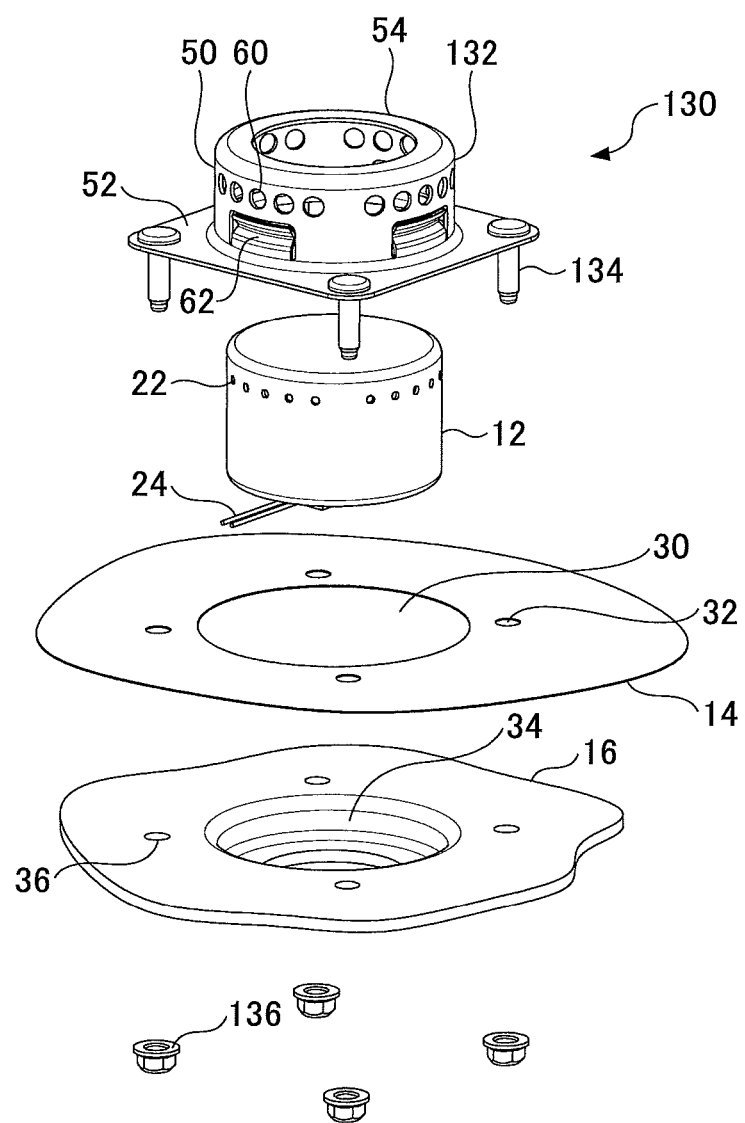
FIG. 10 is an exploded view of an airbag apparatus of a modified example according to an embodiment of the present invention.

Further, in the above-described embodiment, the airbag apparatus 10 includes the inflator 12, the airbag 14, the retainer 16, the inflator flange 18, and the bag ring 20, in which the inflator flange 18 and the bag ring 20 that are independently provided are bolted to each other. However, the present invention is not limited to such embodiment. As illustrated in FIG. 10, an airbag apparatus 130 may include a flange member 132 having the inflator flange 18 and the bag ring 20 integrated to each other.

In this modified example, although the flange member 132 includes the inflator flange 18 having substantially the same shape as that of the above-described embodiment, bolts 134 extending in the axial direction are formed in the periphery of the insertion hole 48 of the flange member 132 (i.e., flange surface of the flange part 52) instead having the through-holes 58 that penetrate the inflator flange 18 in the axial direction.

In manufacturing the airbag apparatus 130 of this modified example, the retainer 16, the inflator 12, the airbag 14, and the flange member 132 are prepared (FIG. 10). Then, after inserting the spreading side of the inflator 12 in the axial direction into the insertion hole 48 of the flange member 132, each caulking piece 62 of the flange member 132 is caulked to the side surface of the inflator 12 by using the caulking apparatus 64. Thereby, the flange member 132 is caulked and fixed to the side surface of the inflator 12. In this example, the relative axial rotation between the inflator 12 and the flange member 132 is constrained. Then, the spreading side of the inflator 12 in the axial direction having the flange member 132 caulked and fixed thereto is inserted into the opening 30 of the airbag 14, and the bolts 134 of the flange member 132 are inserted through the through-holes 32 of the airbag 14. Further, the spreading side of the inflator 12 in the axial direction is inserted into the insertion hole 34 of the retainer 16, and the bolts 134 of the flange member 132 are inserted through the through-holes 36 of the retainer 16. Then, the bolts 134 of the flange member 132 inserted into each of the through-holes 32, 36 are fastened by the nuts 136.

By the fastening with the bolts, the flange member 132 being caulked and fixed to the inflator 12, the airbag 14, and the retainer 16 are attached and fixed to each other. That is, the inflator 12 is attached and fixed to the retainer 16 by bolting the retainer 16 and the flange member 132 being caulked to the inflator 12. In this case, the peripheral part of the opening 30 of the airbag 14 is sandwiched between the flange part 40 of the retainer 16 and the flange part 132 of the flange member 132.

In the structure of this modified example, the inflator 12 has its end surface on the non-spreading side in the axial direction supported by the bottom part 44 of the retainer 16 and its end surface on the spreading side in the axial direction supported by the bottom part 54 of the flange member 132. Therefore, after the assembly of the airbag apparatus 130, the inflator 12 is reliably constrained from moving toward the non-spreading side in the axial direction by the retainer 16 and reliably constrained from moving toward the spreading side in the axial direction by the flange member 132 even after the airbag 14 is spread. Thus, the similar to the airbag apparatus 10 of the above-described embodiment, the airbag apparatus 130 of this modified example can allow the flange member 132 to be easily attached to the inflator 12 without limiting the degree of freedom of the shape of the inflator 12, and the relative movement between the inflator 12 and the flange member 132 in the axial direction can be reliably constrained. Further, with the airbag apparatus 130 of this modified example, the number of components can be reduced compared to the airbag apparatus 10 of the above-described embodiment owing to the flange member 132 that has the inflator flange 18 and the bag ring 20 of the above-described embodiment being integrally formed. Thereby, improvement of assembly efficiency, simplification of assembly, and cost reduction can be achieved.

Further, in the above-described embodiment, the retainer 16 has a function of supporting the inflator 12 on the non-spreading side in the axial direction by forming the retainer 16 with a hat-like shape to support the inflator 12 on the non-spreading side in the axial side. Alternatively, the retainer 16 may be formed with a flat shape along with providing a separate supporting member for supporting the inflator 12 on the non-spreading side in the axial direction. In this case, the supporting member may be bolted to, for example, the retainer 16 and the inflator flange 18.

According to the above-described embodiment of the present invention, the flange member can be easily attached to the inflator without limiting the degree of freedom of the shape of the inflator and reliably constrain the relative movement between the inflator and the flange member in the axial direction.

The present application is based on and claims the benefit of priority of Japanese Patent Application No. 2012-249746 filed on Nov. 13, 2012, with the Japanese Patent Office, the entire contents of which are hereby incorporated by reference.

DESCRIPTION OF THE REFERENCE NUMERALS 10, 130 airbag apparatus
12 inflator
16 retainer
14 airbag
20 bag ring
34 insertion hole of retainer
44 bottom part of retainer
48 insertion hole of inflator flange
54 bottom part of inflator flange
62 caulking piece
64 caulking apparatus
74, 134 bolt
76, 136 nut
110 projecting part
112 step
132 flange member

The invention claimed is:
1. An airbag apparatus comprising:
a cylindrical-shaped inflator that generates gas;
an airbag that is inflated by the gas generated by the inflator;
a retainer body to which the inflator is attached and fixed and including an insertion hole into which the inflator can be inserted;
a flange member that is caulked or press-fitted to the inflator and that constrains the inflator from moving toward one end side in an axial direction and includes an insertion hole into which the inflator can be inserted and a flange surface extending outward in a radial direction; and
a retaining member that constrains the inflator from moving toward another end side in the axial direction;
wherein the inflator is attached and fixed to the retainer body by bolting the retainer body and the flange member.

2. The airbag apparatus as claimed in claim 1,
wherein the retaining member is a member that is integrated to the retainer body.

3. The airbag apparatus as claimed in claim 1, wherein the flange member is caulked to a side surface of the inflator.

4. The airbag apparatus as claimed in claim 1, wherein the flange member further includes a supporting member for supporting the inflator by contacting one end surface of the inflator in the axial direction.

5. The airbag apparatus as claimed in claim 1,
wherein the inflator has a side surface including a side surface projecting part projecting outward in the radial direction,
wherein the flange member is caulked or press-fitted to a side surface of the inflator to form a step including the side surface projecting part of the inflator on the one end side in the axial direction and constrains the inflator from moving toward the one end side in the axial direction.

6. The airbag apparatus as claimed in claim 1, further comprising:
a bag ring that supports an opening peripheral part of the airbag;
wherein the airbag is arranged so that the opening peripheral part of the airbag is sandwiched between the flange member and the bag ring when the retainer body, the flange member, and the bag ring are bolted.

7. The airbag apparatus as claimed in claim 1, wherein the airbag is arranged so that an opening peripheral part of the airbag is sandwiched between the retainer body and the flange member when the retainer body and the flange member are bolted.

* * * * *